(12) United States Patent
Fulmer et al.

(10) Patent No.: US 9,773,169 B1
(45) Date of Patent: Sep. 26, 2017

(54) SYSTEM FOR CAPTURING A BIOMETRIC IMAGE IN HIGH AMBIENT LIGHT ENVIRONMENTS

(71) Applicants: Christopher R. Fulmer, Jupiter, FL (US); George W. McClurg, Jensen Beach, FL (US); John M. Burgan, North Palm Beach, FL (US); James L. Cambier, Jupiter, FL (US); Donald E. Russ, Lake Park, FL (US); Daniel H. Raguin, Acton, MA (US)

(72) Inventors: Christopher R. Fulmer, Jupiter, FL (US); George W. McClurg, Jensen Beach, FL (US); John M. Burgan, North Palm Beach, FL (US); James L. Cambier, Jupiter, FL (US); Donald E. Russ, Lake Park, FL (US); Daniel H. Raguin, Acton, MA (US)

(73) Assignee: CROSS MATCH TECHNOLOGIES, INC., Palm Beach Gardens, FL (US)

( * ) Notice: Subject to any disclaimer, the term of this patent is extended or adjusted under 35 U.S.C. 154(b) by 1146 days.

(21) Appl. No.: 13/830,909

(22) Filed: Mar. 14, 2013

Related U.S. Application Data

(60) Provisional application No. 61/723,206, filed on Nov. 6, 2012.

(51) Int. Cl.
*G06K 9/00* (2006.01)
*G06K 9/20* (2006.01)

(52) U.S. Cl.
CPC ..... *G06K 9/00604* (2013.01); *G06K 9/00597* (2013.01); *G06K 9/00885* (2013.01); *G06K 9/2027* (2013.01); *G06K 9/2036* (2013.01)

(58) Field of Classification Search
CPC .......................... G06K 9/00597; G06K 9/00604
See application file for complete search history.

(56) References Cited

U.S. PATENT DOCUMENTS

| 5,220,361 | A | * | 6/1993 | Lehmer | ................. A61B 3/113 351/210 |
|---|---|---|---|---|---|
| 6,134,339 | A | * | 10/2000 | Luo | ..................... G06K 9/00604 382/115 |
| 6,753,919 | B1 | | 6/2004 | Daugman | |

(Continued)

OTHER PUBLICATIONS

National Optical Astronomy Observatory, "Recommended Light Levels" (no date), available online at https://www.noao.edu/education/QLTkit/ACTIVITY_Documents/Safety/LightLevels_outdoor+indoor. pdf.*

(Continued)

*Primary Examiner* — David N Werner
(74) *Attorney, Agent, or Firm* — Lukacher Law Group; R. S. Rosenholm

(57) ABSTRACT

The invention provides an image capture system, apparatus and method for capturing a biometric image in high ambient light environments. Reflections from ambient light can introduce unwanted environmental pattern noise that can interfere with extracting information from a captured biometric image. The invention performs attenuation of ambient light without requiring employment of shielding to prevent ambient light from reflecting off of a surface being imaged. As a result, the invention can be deployed into environments with varied indoor or outdoor lighting characteristics.

21 Claims, 11 Drawing Sheets

(56) References Cited

U.S. PATENT DOCUMENTS

| | | | |
|---|---|---|---|
| 6,885,393 B2 | 4/2005 | Herre | |
| 8,254,768 B2* | 8/2012 | Braithwaite | G06K 9/00255 315/241 P |
| 8,260,008 B2* | 9/2012 | Hanna | G06K 9/00604 382/100 |
| 8,317,325 B2 | 11/2012 | Raguin et al. | |
| 8,364,971 B2* | 1/2013 | Bell | G06F 21/32 382/117 |
| 9,124,798 B2* | 9/2015 | Hanna | H04N 5/23212 |
| 2002/0097498 A1* | 7/2002 | Melville | G02B 7/287 359/630 |
| 2002/0131623 A1 | 9/2002 | Musgrave et al. | |
| 2004/0170304 A1* | 9/2004 | Haven | A61B 3/113 382/115 |
| 2005/0248725 A1 | 11/2005 | Ikoma et al. | |
| 2006/0245623 A1* | 11/2006 | Loiacono | G06K 9/2027 382/117 |
| 2006/0274918 A1* | 12/2006 | Amantea | G06K 9/6253 382/117 |
| 2007/0003110 A1* | 1/2007 | Gutta | G06K 9/00006 382/115 |
| 2007/0263099 A1 | 11/2007 | Motta et al. | |
| 2008/0075441 A1* | 3/2008 | Jelinek | G06K 9/00604 396/18 |
| 2008/0181467 A1* | 7/2008 | Zappia | G06K 9/00604 382/117 |
| 2008/0186449 A1* | 8/2008 | Sur | G06K 9/00604 351/210 |
| 2008/0186701 A1* | 8/2008 | Omi | B60Q 3/0276 362/231 |
| 2008/0226138 A1* | 9/2008 | Suzuki | A61B 3/10 382/117 |
| 2009/0208064 A1 | 8/2009 | Cambier | |
| 2009/0245594 A1* | 10/2009 | Abramovich | G06K 9/2018 382/117 |
| 2009/0274345 A1* | 11/2009 | Hanna | G06K 9/00604 382/115 |
| 2010/0034529 A1* | 2/2010 | Jelinek | G02B 7/36 396/95 |
| 2010/0110374 A1 | 5/2010 | Raguin et al. | |
| 2010/0278394 A1 | 11/2010 | Raguin et al. | |
| 2011/0228975 A1* | 9/2011 | Hennessey | A61B 3/113 382/103 |
| 2012/0201430 A1 | 8/2012 | Cambier | |
| 2013/0016203 A1* | 1/2013 | Saylor | G06K 9/00604 348/78 |
| 2013/0120760 A1 | 5/2013 | Raguin et al. | |
| 2013/0215275 A1* | 8/2013 | Berini | G06F 21/32 348/150 |

OTHER PUBLICATIONS

ISO/IEC 19794-6, Information Technology-Biometric Data Interchange Formats—Part 6-Iris—Image Data, Jun. 1, 2005; pp. 13-17; Includes description of Iris Image quality criteria.

Verma et al., Daughman's Algorithm Method for Iris Recognition—A Biometric Approach, International Journal of Emerging Technology and Advanced Engineering, vol. 2, Issue 6, Jun. 2012, pp. 177-183; Includes description of an iris recognition algorithm.

\* cited by examiner

SYSTEM FOR CAPTURING A BIOMETRIC IMAGE IN HIGH AMBIENT LIGHT ENVIRONMENTS

CROSS REFERENCE TO RELATED PATENT APPLICATION(S)

This document is a United States non-provisional utility patent application that claims priority and benefit to U.S. (utility) provisional patent application having Ser. No. (61/723,206), that was filed on Nov. 6, 2012 and that is entitled "SYSTEM FOR CAPTURING A BIOMETRIC IMAGE IN HIGH AMBIENT LIGHT ENVIRONMENTS", and which is incorporated herein by reference in it's entirely.

BACKGROUND OF THE INVENTION

Biometric measurements are measurements of unique attributes of living entities. For example, fingerprint and iris patterns are collectively considered unique to each individual human being. Likewise, some visual patterns along a surface of a living entity, also referred to herein as a biometric surface, are also considered unique for each living entity. In some circumstances, a substantial presence of ambient light can interfere with accurately capturing a clear image of a biometric surface. This is especially true when such an image is captured for the purpose of performing a biometric measurement of a surface.

One ambient light reduction solution known in the art is the use of a mechanical shield such as is employed in the SEEK and ISCAN2 products from Cross Match Technologies, Inc. (Palm Beach Gardens, Fla.). In these two examples, a mechanical hood is utilized to bridge the gap between the apparatus' image capture instrument and the subject's face so that the apparatus can capture an image of the subject's iris with minimal ambient light effects. However, a preferred solution is one that does not require touching of the scanning apparatus or a mechanical feature thereof to the subject in order to capture a particular biometric feature in bright ambient light conditions.

The discussion above is merely provided for general background information and is not intended to be used as an aid in determining the scope of the claimed subject matter.

BRIEF DESCRIPTION OF THE INVENTION

Accordingly, one object of the present invention is to provide a system, apparatus and method for capturing a biometric image in high ambient light environments.

It is another object of the present invention to provide for mitigation of the effects of ambient light without requiring mechanical shielding that extends from the apparatus towards one or more subjects, for which biometric information is being imaged.

A further objective of the present invention is to provide for imaging of biometric features using a two-dimensional (2D) sensor comprising an array of photosensitive pixels. This 2D sensor array, by way of example, may be constructed using complementary metal oxide semiconductor (CMOS) or charge-coupled device (CCD) technology, Thin Film Transistors (TFT), or any other technology known to be sensitive to photons or electromagnetic radiation (ER).

Briefly described, the present invention embodies an apparatus containing an imaging system, an illumination system, a shutter mechanism, and internal processor(s) for controlling the timing of the electronics and the analyzing of the captured images. The imaging system comprises a 2D sensor, an optical imaging system, and a means for autofocus, while the illumination system comprises an illumination source and illumination optics.

The imaging system is designed to achieve an optical and electronic resolution suitable for the specific biometric features being imaged. For the specific example of iris imaging, it is desirable to have imaging contrast that measures favorably via recommendations contained in the ISO/IEC 19794-6:2011 iris data interchange standard. In some embodiments, the optical imaging system is comprised of one or more of a selection of lenses, mirrors, Fresnel and diffractive elements. Optionally, the optical imaging system includes a variable focus lens assembly.

Since the exact distance between the imaging system and the subject is not fixed, an autofocus lens mechanism is provided that is capable of changing the focal plane location of best focus. Such an autofocus lens mechanism may be achieved by a variety of methods including the movement of the 2D sensor relative to the imaging optics along the optical axis, the movement of individual lenses or groups of lenses comprising the imaging system along the optical axis or using lenses whose optical power may be varied mechanical or electronically. Such a combination of lens assembly and control logic for movement of lenses enables a focus function for capturing a biometric image of sufficient quality of a subject who is located at a non-fixed distance from the lens assembly of the system.

The illumination system of the apparatus comprises an illumination source and illumination optics. The illumination source is chosen such that it emits light that achieves sufficient illumination and contrast of the particular biometric features being imaged. Further, the illumination source is chosen from those that are capable of achieving high brightness compared to the ambient light and preferably chosen among light sources that can be pulsed or flashed. By way of example, for iris imaging, Light Emitting Diode (LED) sources that emit in the 700-900 nm wavelength range (near IR) are suitable for some embodiments. The illumination optics are designed to direct light from the illumination source towards the biometric features of the subject being imaged.

For the present invention to work under high (10,000 lux) ambient light conditions, it is preferable that the exposure effects of ambient light are less than or equal to 30% of the overall exposure effect of the pixel elements of the grayscale range being output by the apparatus' electronics. This is achieved through a combination of the intensity of the illumination system and the timing of the sensor integration. By configuring the intensity of the system projected light that is directed towards the subject being imaged to be brighter than the ambient light directed towards the same pixel location within the image, and by having the effective integration time of the sensor pixels short, the amount of ambient light received by the sensor and affecting the exposure of each pixel within the sensor will be minimized.

Although the previous paragraph and some of the latter text of the present invention refers to high light-level applications as being 10.000 lux, it is understood by one skilled in the art that different units of light level may be utilized which include, but are not limited to, mW/cm2. For a strictly photopic application lux (lumens/m2) may be an appropriate unit since this unit of electromagnetic radiation (ER) power reflects the spectral sensitivity of the human eye and how it peaks at green wavelengths (555 nm) and tapers off in sensitivity for shorter and longer wavelengths.

For other applications that are not tied to the response of the human eye or are in spectral regions where the human eye has low sensitivity, such as the UV or infrared, mW/cm2 may be a more appropriate unit of measure. In the following text where we refer to lux when referring to a 715 to 900 nm infrared imaging of the human eye, we refer to lux in order to relate the ambient light to that sensed by the subject and not necessarily the level being measured by the instrument. Rather, the image capture system will be responding to only the near infrared, preferably the 700-900 nm (or 715 to 900 nm in one embodiment) spectral region of the solar reflected spectra (ER reflected off of grass, buildings, sky, etc.) corresponding to the visible portion of the spectra being at 10 k lux or greater.

In another embodiment of the present invention a means for monitoring or sensing the amount of ambient light coming off of the biometric surface of interest is present such that the ratio of ambient light to system-generated light in the image of a biometric surface may be calculated. Said sensing may be accomplished by taking a sequence of pictures of the biometric surface, alternating between captures with the system-generated illumination turned on and off or may utilize a separate light sensor that specifically is for measuring of ambient light. When the ambient light is determined to be at too high a percentage of the overall exposure received by the apparatus' imaging system, the system reacts by increasing the amount of system-generated light imaged and/or reducing the amount of ambient light by advising the operator (user) to shield his eyes and/or advising the operator to rotate the direction from which the biometric image is being captured.

For the purposes of this disclosure, the effective integration time is the time over which the sensor is sensitive to the reflected light from the object. As such, the effective integration time may differ from the actual integration time of the sensor pixels due to the use of flash illumination or shutters. It is therefore a further feature of the present invention that the apparatus possesses a shutter, being a mechanical, electro-optical, or electronic type, that prevents the sensor from integrating photons from the biometric surface when not desired. It is also preferable that the apparatus of the present invention incorporates a band pass spectral filter that is designed to pass the wavelength band(s) of substantially non-ambient light used for illumination of the subject and to reject wavelength band(s) of substantially ambient light. In some embodiments, the filter is a high pass spectral filter.

The autofocus lens mechanism of the present invention is unique in that, coupled with the image processing module of the device, it operates such that first a specific biometric feature of the subject is identified and then the focus quality of that specific biometric feature is measured. In response, the autofocus lens mechanism adjusts focus, and repeats the biometric feature search and the focus quality calculation. When the image processing module of the apparatus determines that the captured biometric image, also referred to herein as a frame, is of sufficient focus quality, the system automatically (with no operator (user) intervention) stores the biometric image.

This brief description of the invention is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention can encompass other equally effective embodiments.

The drawings are not necessarily to scale. The emphasis of the drawings is generally being placed upon illustrating the features of certain embodiments of the invention. In the drawings, like numerals are used to indicate like parts throughout the various views. Differences between like parts may cause those parts to be indicated with different numerals. Unlike parts are indicated with different numerals. Thus, for further understanding of the invention, reference can be made to the following detailed description, read in connection with the drawings in which.

DETAILED DESCRIPTION OF THE INVENTION

Figure 1:
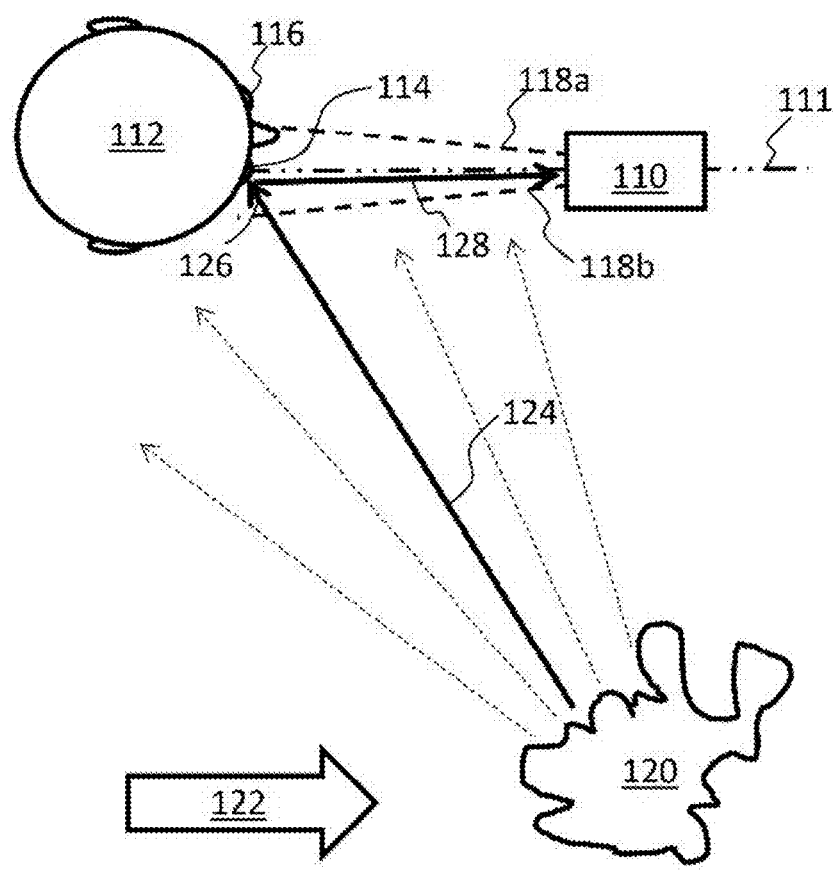
FIG. 1 illustrates a top-down view of an image capture system while being employed for capturing an image of an eye of a subject located within a high ambient light environment.

FIG. 1 illustrates a top-down view of an image capture system 110 while being employed for capturing an image of an eye 114 of a subject located within a high ambient light environment. As shown, an embodiment of the image capture system 110 is positioned directly towards a right eye 114 of a subject 112. This system is also handheld and portable. In one embodiment, this system 110 weighs approximately 3.5 pounds (including batteries, mugshot camera, fingerprint scanner, touch liquid crystal display, and onboard computer) and is carried with two hands via a handle grip (not shown).

In this outdoor and/or sunny environment, there is a substantial amount of ambient light flux surrounding the subject 112 and the biometric imaging system 110. Within this environment, some of the ambient light flux 122 reflects off objects, such as an object 120 and is re-directed 124 towards the right eye 114 of the subject 112. Some of this ambient light flux 126, also reflects off of the right eye 114, and in particular an iris portion of the right eye 114, of the subject and is re-directed 128 into the capture volume (bounded by dashed lines 118a and 118b) of image capture system 110. The optic axis 111 of the image capture system 110 is denoted with a dashed and dotted line.

The above described light reflection scenario is an example of one such environment where the reflection of ambient light affects a captured image in undesirable ways. This type of reflection can obscure at least a portion of an image captured by the image capture system 110 and can render the captured image not suitable for enabling a sufficiently accurate biometric measurement of the subject 112.

Unlike at least some other biometric imaging systems or devices, the biometric imaging system 110 is designed for use in high ambient light conditions and does not require environments lacking a substantial amount of ambient light, such as within an indoor environment. Nor is this image capture system 110 designed to require ambient light shielding for itself or of the eye 114 of the subject 112 while performing an image capture operation. Note that some indoor locations can have substantial ambient light that is passing from the sun and through the glass of wall and/or roof windows. Instead, the image capture system 110 is designed to attenuate and to effectively eliminate such undesirable effects of reflecting ambient light within an outdoor and/or sunny environment.

Figure 2:
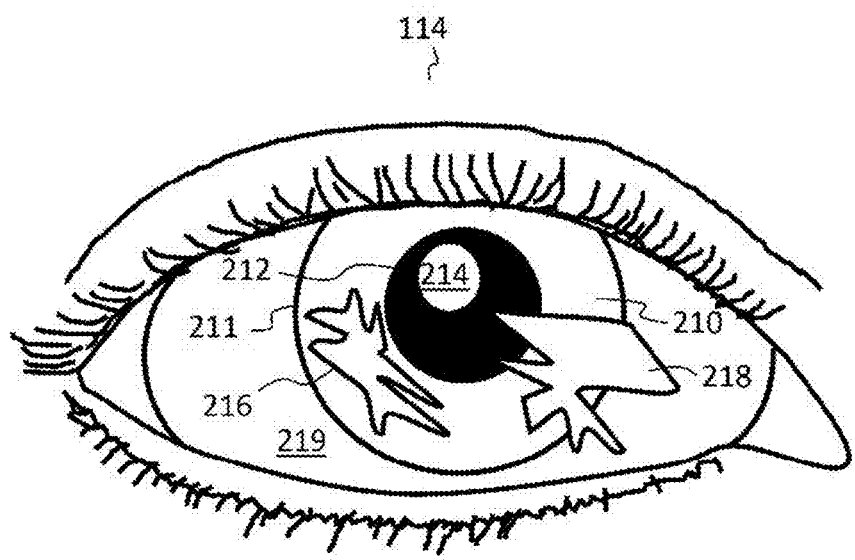
FIG. 2 illustrates reflection of ambient light off a surface of an eye of a subject.

FIG. 2 illustrates reflection of ambient light off a surface of the eye 114 of the subject 112 of FIG. 1. As shown, reflections of ambient light 216, 218 obscure portions of the eye 114, and in particular, obscure portions of an iris 210 of the eye 114 of the subject 112. The iris 210 is the annular portion of FIG. 2 defined on the outside by the sclera 219 and its approximately circular boundary 211 and the pupil 212 of eye 114. The reflections 216 and 218 reduce biometric information that could be revealed by an entire unobscured image of the iris 210. Such reflections 216, 218 can render the captured image not suitable for enabling a sufficiently accurate biometric measurement of the subject 112.

Also notice that another portion of the eye 114, being a pupil portion 212, also includes an entire reflection 214 and a portion of a reflection 218. The reflection 214 is a saturated reflection that resides entirely within the pupil portion 212 of the eye 114 and results from the transmission of system generated illumination transmitted from one or more light emitting diodes (LEDs). For the purpose of illustration, only a single reflection is shown here, however, multiple reflections like reflection 214, that each correspond to system generated electromagnetic radiation (ER) emitted by one of multiple LEDS, can also occur. These multiple reflections can also form a cluster than may or may not appear as one reflection.

This system-generated specular reflection is preferably located entirely outside of the iris 210, and as a result, does not interfere with biometric measurement of the iris 210. The reflection 218 resides partially within the iris 210 and partially within the pupil 212 of the eye 114 of the subject 112, and can interfere with a biometric measurement of the iris 210. Although there is no biometric information in the pupil, the pupil can be used to accurately locate other areas of biometric information within the eye 114 of the subject 112.

Figure 3:
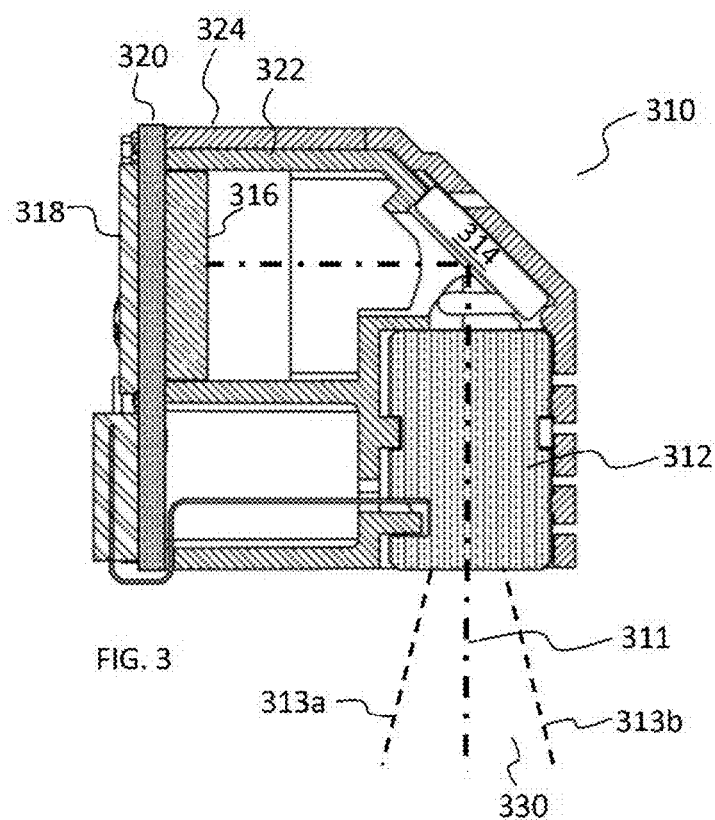
FIG. 3 illustrates a cross-sectional view of a portion of an embodiment of the image capture system of FIG. 1.

FIG. 3 illustrates a cross-sectional view of a portion 310 of an embodiment of the image capture system 110 of FIG. 1. As shown, the portion 310 of the image capture system 110 receives light traveling through a volume of space, also referred to herein as an imaging cone 330, allowable volume 330 or capture volume 330 where said volume is bounded by dashed lines 313a and 313b. In some embodiments, the imaging cone 330 is not exactly conical in shape, due to a rectangular image sensor, for example. Light received from the imaging cone 330 passes through lens assembly 312 which, in some embodiments, contains a band pass spectral filter and reflects off of surface mirror 314 and impinges onto a light sensitive surface of an image sensor 316. The optic axis 311 for the described imaging system is denoted as a dashed and dotted line.

A processor (central processing unit) 318 and a printed circuit board (PCB) 320, which interoperate with the image sensor 316, are located on an opposite side of the image sensor 316. Also shown are an optical chassis 322 and a chassis cover 324. Although the Figures contained in the invention disclosure show or imply that each eye of the subject is captured by a separate single image capture system portion 310, this is not a restriction of the present invention. The capture volume 330 may be designed such that it contains a single eye (as depicted in FIG. 1), but it may be designed to capture two eyes, the entire face of a subject 112, or the faces of several subjects.

Figure 4A:
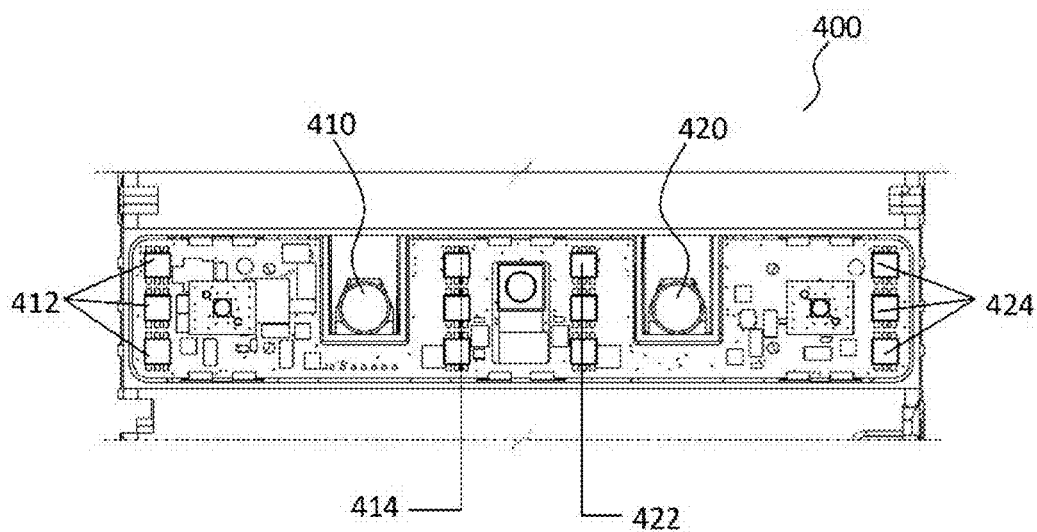
FIGS. 4A and 4B illustrate front side and perspective views, respectively, of a dual iris embodiment of the image capture system.
Figure 4B:
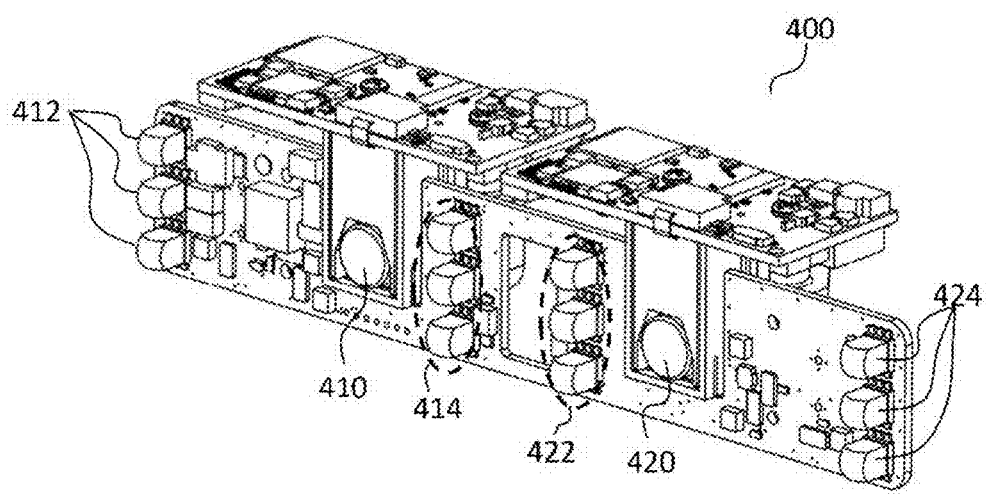

FIGS. 4A-4B respectively illustrate a front side view and a perspective view of a dual iris image capture embodiment 400 that functions like that of the single eye image capture system 110, 310 of FIGS. 1 and 3. FIG. 4A illustrates a front side view of a dual eye embodiment 400 of the image capture system, as seen from a viewing perspective of the subject 112 (i.e., in a viewing direction substantially along light ray 128 of FIG. 1). FIG. 4B illustrates a non-frontal perspective view of the embodiment of FIG. 4A.

Referring to FIG. 4A, the front side of the image capture system 400 is shown without an attached protective cover, window, or housing. Such an attached protective cover, window or housing may be removable or fixed. As shown, this embodiment of the image capture system 400 has a left side lens assembly 410 and a right side lens assembly 420, as seen from a viewing perspective of the subject 112 of FIG. 1. The left side lens assembly 410 corresponds to a left eye 116 of the subject 112 and the right side lens assembly 420 corresponds to the right eye 114 of the subject 112 of FIG. 1. Electromagnetic radiation (ER) located external to the system 400 enters each lens assembly 410, 420. The electromagnetic radiation that enters each lens assembly 410, 420 enters each lens assembly 410, 420 from a volume of space, like the volume of space 330 of FIG. 3 through which the ER travels.

As seen from a viewing perspective of the subject 112, each lens assembly 410, 420 is flanked by two groups of light emitting diodes (LEDs). A left most group 412 of (3) light emitting diodes (LEDs) is located to the left of the left side lens assembly 410. Another left center group 422 of (3) light emitting diodes (LEDs) is located to the right side of the left side lens assembly 410. A right center group 414 of (3) light emitting diodes is located to the left side of the right side lens assembly 420. Another right most group 424 of (3) light emitting diodes is located to the right of the right side lens assembly 420.

The aforementioned light emitting diodes are designed to project (flash) electromagnetic radiation within a pre-defined range of wavelengths, towards the iris 210 of each eye 114, 116 of the subject 112, for a limited period of time. This electromagnetic radiation is referred to herein as system generated electromagnetic radiation (ER) or system generated light. Although illustrated in FIG. 4A as groups (banks) 412, 414, 422, 424 of (3) LEDs, depending upon the power and angular distribution of the LEDs chosen, more or less than (3) LEDs may be assigned in each group. Further, although two groups of LEDs have been illustrated for each lens assembly 410 and 420, one skilled in the art may design the image capture system to utilize more or less illumination groups per lens assembly.

Figure 4C:
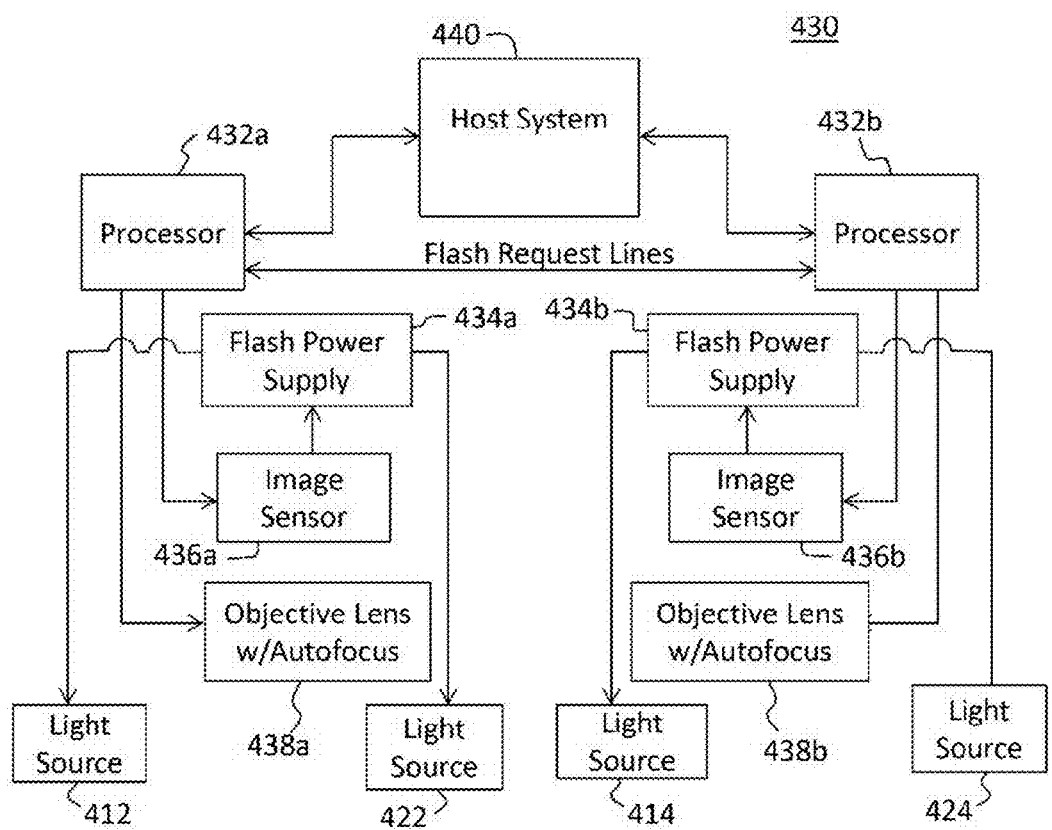
FIG. 4C Illustrates a system block diagram of the control architecture.

FIG. 4C illustrates a simplified block diagram of an embodiment of the control system 430 of FIGS. 4A-4B. As shown for this embodiment, the system is designed to control two image capture systems in parallel over a period of time. By way of example, the two image capture systems may be those required to perform a biometric image capture of two separate irises in parallel over a period of time. In other embodiments, the system is designed to capture a biometric image of one iris during one period of time.

As shown, the control system includes the illumination system which for this clarifying example is illustrated as four (4) groups of light emitting diodes (LEDs) 412, 414, 422, 424. The two (2) groups of light emitting diodes 412, 422 receive power from power supply 434*a*, and the two (2) groups of light emitting diodes 414, 424 receive power from power supply 434*b*. The processor 432*a* interfaces with an image sensor 436*a* and interfaces with the power supply 434*a* via the image sensor 436*a*. For this particular embodiment, the processor 432*b* interfaces with an image sensor 436*b* and interfaces with the power supply 434*b* via the image sensor 436*b*. Each processor 432*a* and 432*b*, interfaces with a host system 440 as well as objective lens with autofocus 438*a* and 438*b*, respectively. Objective lens with autofocus 438*a* corresponds in part with lens assembly 410 of FIGS. 4A-B and objective lens with autofocus 438*b* corresponds in part with lens assembly 420 of FIGS. 4A-B.

To perform a biometric measurement of an iris, the system 430 captures a series of one or more images of the iris over time. Each image in the series is captured and processed to determine if the image satisfies image quality requirements. Satisfying the image quality requirements is a prerequisite for performing a biometric measurement upon the image. Satisfying the image quality requirements requires actions, including positively identifying a presence and location of an iris within the image, measuring a size of the iris within the image, verifying that the iris in the image is not occluded by, for example, an eye lid. These actions further include verifying that the iris in the image is not clipped and measuring and verifying that the image has sufficient exposure (brightness) and contrast and focus. The first image in this series that satisfies the image quality criteria is further processed for performance of a biometric measurement. In some embodiments, the series of images includes at least one image excluding system generated electromagnetic radiation.

In some embodiments, each processor 432*a*-432*b* communicates the captured images of the series to the host system 440. The host system 440 may process each of these images for satisfaction of quality requirements and optionally for performing the biometric measurement of one or more image of the series, where applicable. Upon completely and successfully processing a final image of the series, the capture loop is terminated.

The processing referred to above includes execution of at least a portion of a set of image processing algorithms upon each captured image within the series. The set of algorithms include those designed for performing identification, capture, cropping and re-sampling of an iris portion of a captured image, and include biometric encoding of the iris portion of the image. Localization algorithms search for and detect the location of edges within the image. These edges include that between an iris and sclera portions of the eye. The cropping algorithms along with the resampling algorithms are automated and are preferentially used after the iris has been located and determined to be in focus with limited occlusions, but before template generation. The cropping and resampling algorithms are used to ensure that the final iris image to be saved has the correct number of pixels and correct border around the iris portion of the image to be compatible with the algorithms used for template generation and to be compatible with the iris image database where the iris images will be stored.

Gradient measurement algorithms, also referred to as frequency measurement algorithms, can detect that the iris portion of a captured image is out of focus, and in response, cause adjustment of focus between the capturing of individual images within the series. Upon completion of processing of a preview image, the algorithm can direct that image capture parameters (settings), such as gain, focus, aperture size and/or the amount (duration) of system light to be projected onto the eye of the subject be adjusted, and further direct that another (next) image of the series be captured using the adjusted image capture parameters.

In some circumstances, an iris portion of an image cannot be found in any of the images of the series, and as a result, the series of captured images will terminate within a predetermined period of time. In some embodiments, this period of time is equal to 30 seconds. In some circumstances, the iris portion of the image may be represented by too many pixels. In response, the image is re-sampled to obtain an iris portion of the image that is represented by a number of pixels within a desired range, to accommodate best algorithm performance.

Figure 5:
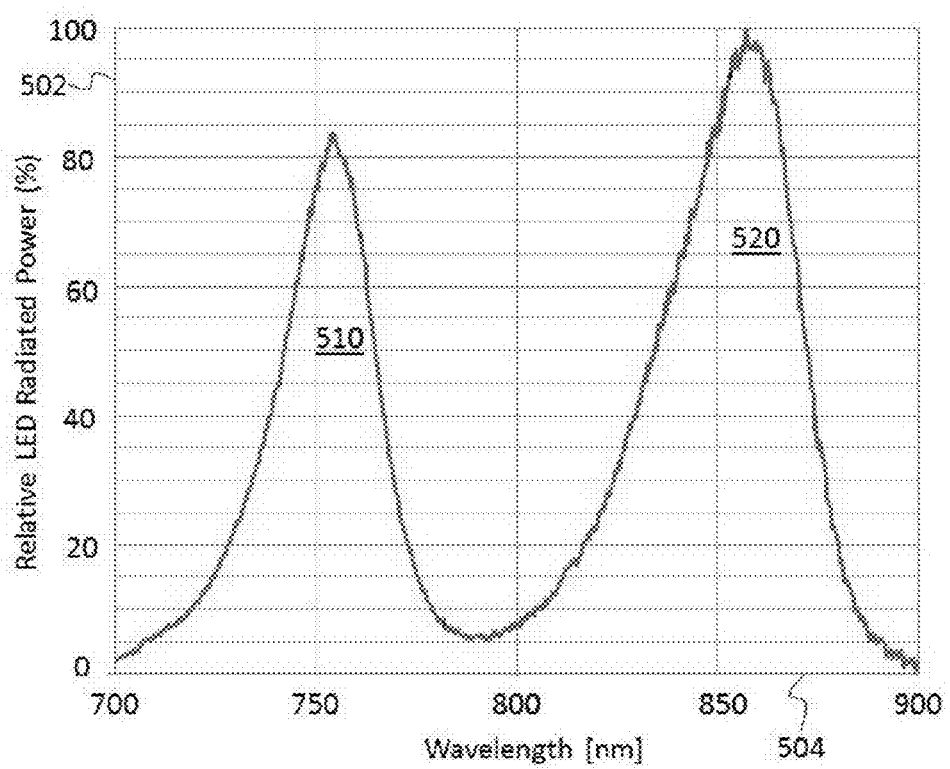
FIG. 5 illustrates a distribution of system-generated electromagnetic radiation with respect to a wavelength spectrum that is flash projected from light emitting diodes (LEDs)

FIG. 5 illustrates an empirical measurement of the distribution of system generated electromagnetic radiation (ER) with respect to a wavelength spectrum that is flash projected from light emitting diodes of the embodiment shown in FIGS. 4A-4B. As shown, the intensity of the electromagnetic radiation being transmitted is represented along a vertical axis 502 and represented as a percentage of relative radiant intensity (RRI). A wavelength (spectrum) distribution of the electromagnetic radiation is represented along a horizontal axis 504 in terms of nanometers (nm). The intensity of the electromagnetic radiation is a measurement of an amount of electromagnetic radiation, for example an amount of photons per second per unit area, being transmitted or received at a particular location.

In the embodiment shown in FIG. 5, the system generated electromagnetic radiation (ER) is transmitted as follows: A first range (distribution) of wavelengths 510 of the electromagnetic radiation are within a first substantially normal distribution that is centered at a wavelength value of approximately 755 nanometers. A second range (distribution) of wavelengths 520 are within a second substantially normal distribution that is centered at a wavelength value of 855 nanometers. Transmission of system generated ER which is referred to herein as a flash projection or a flash, is performed within a time duration that can be varied. Typically, the flash projection occurs within 5.0 milliseconds or less. However, in some use scenarios, the flash projection is controlled to exceed a time of transmission in excess of 5.0 milliseconds.

The electromagnetic radiation that is system generated and flash projected towards the iris 210 of the eye 114 of the subject 112 is reflected back into the lens assembly 410, 420 of the image capture system 110, 310, 400. The value of each pixel within a captured image is dependent upon a cumulative amount of radiation, ambient and system generated, that impinges upon the pixel during a time of exposure of that pixel. A cumulative amount of electromagnetic radiation received over a period of time by a pixel causes a stored value associated with the pixel, also referred to herein as a pixel value, to increase. The increase in the pixel value is referred to herein as an "effect upon exposure" or as an "exposure effect" upon a pixel by the cumulative amount of electromagnetic radiation that has impinged upon the pixel during a period of time of exposure of the pixel. Both ambient electromagnetic radiation and system generated electromagnetic radiation contribute to the exposure effect upon each pixel of the image sensor.

Figure 6A:
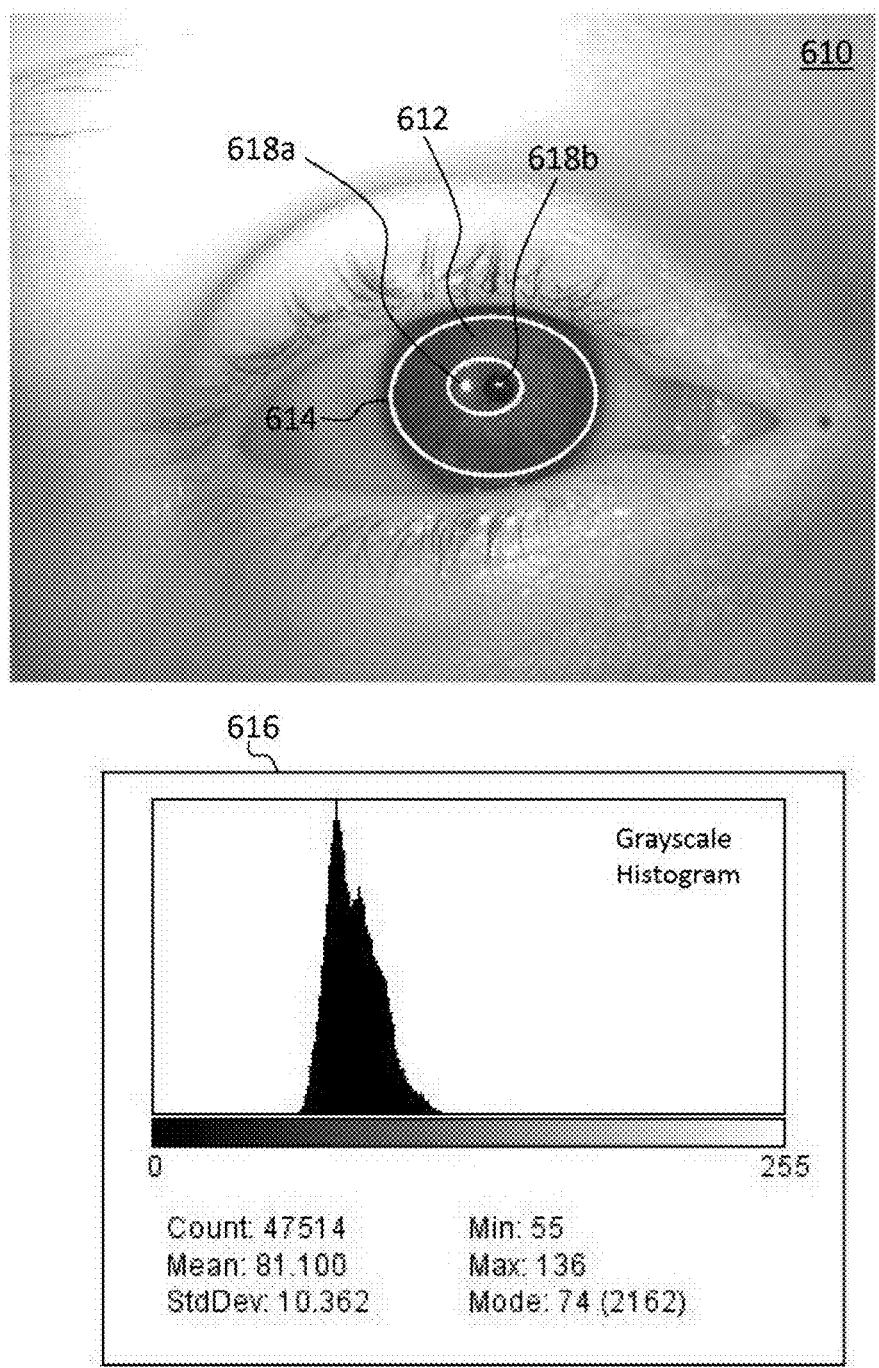
FIGS. 6A through 6D illustrate the effects of different amounts of exposure upon a captured image of an iris portion of an human eye.
Figure 6B:
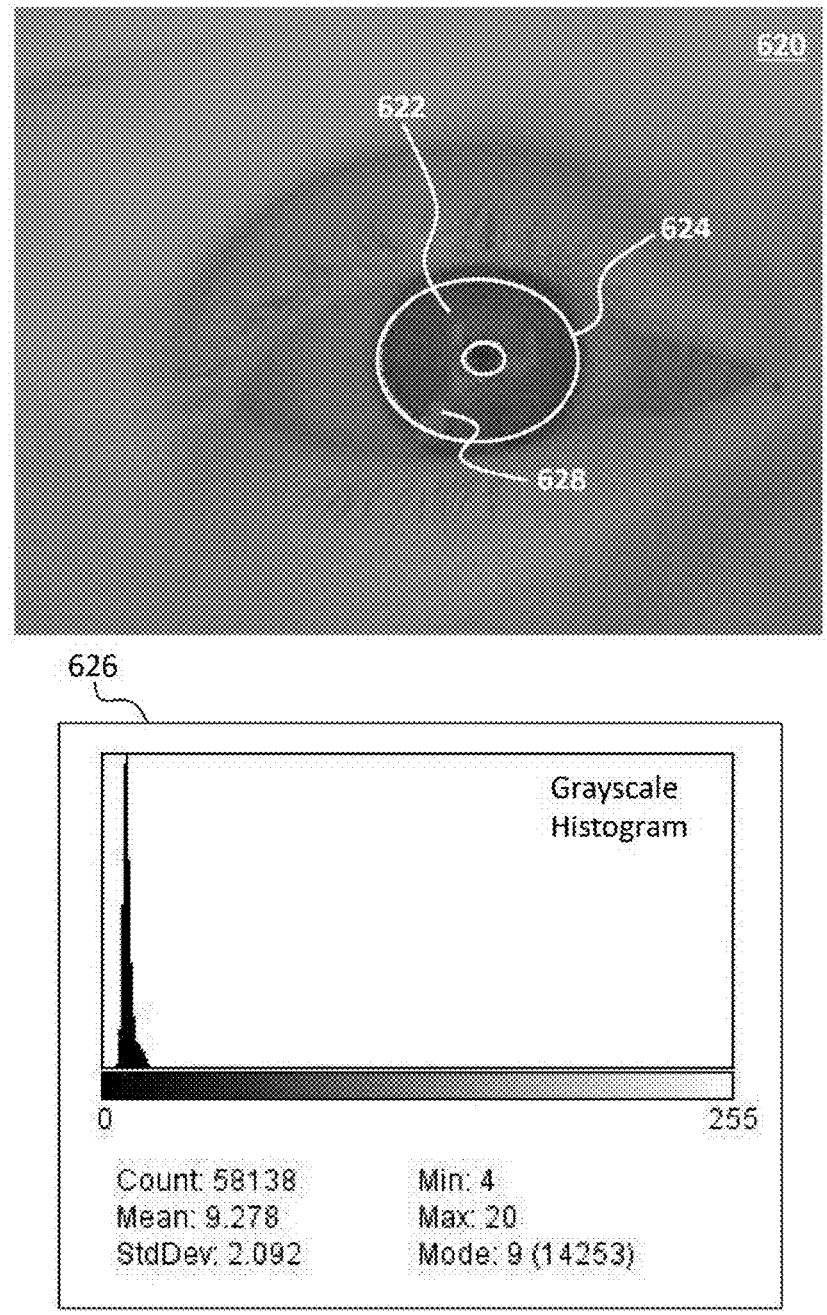
Figure 6C:
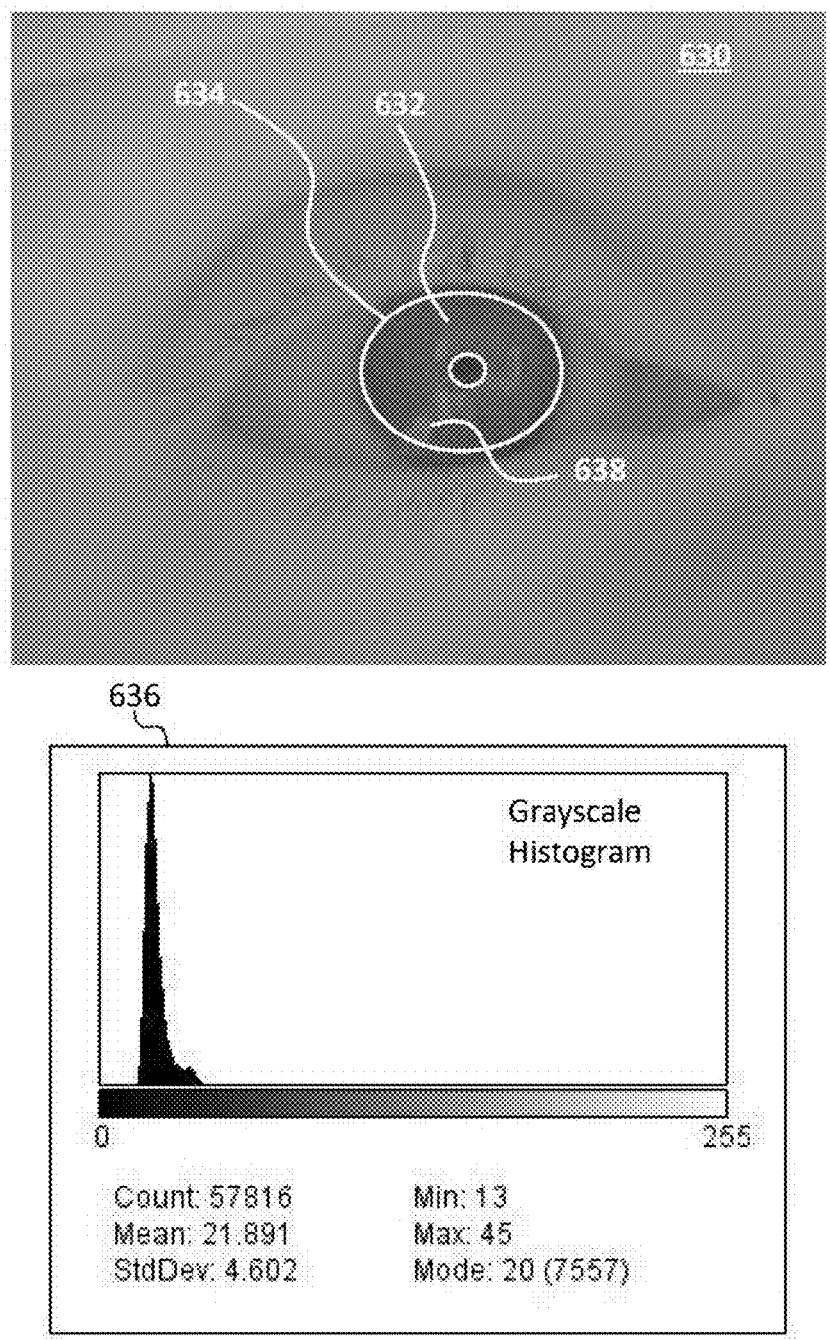
Figure 6D:
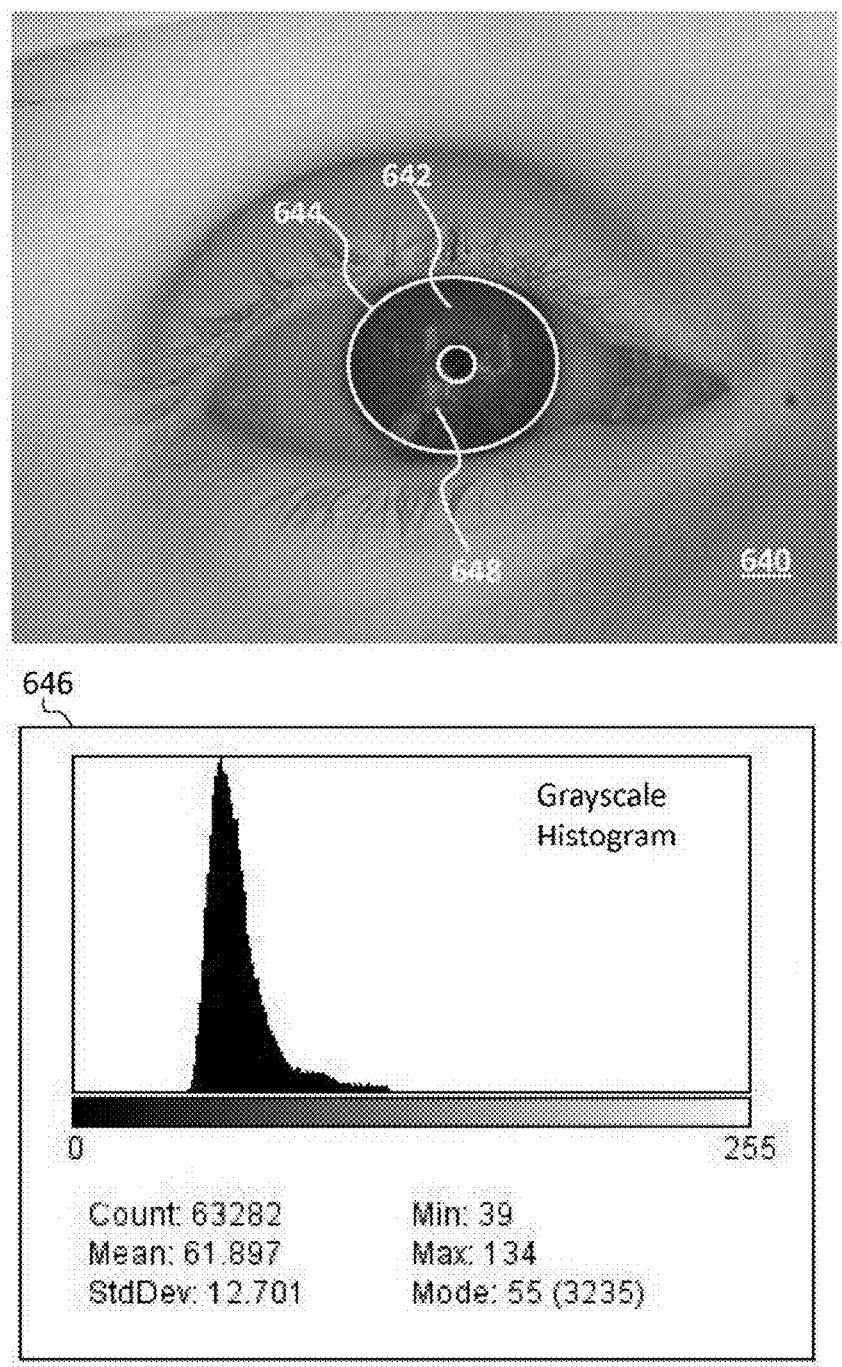

FIGS. 6A through 6D each illustrate different amounts of exposure effect upon a captured image of an iris portion of a human eye. As shown, FIG. 6A depicts eye image 610, FIG. 6B depicts eye image 620, FIG. 6C depicts eye image 630, and FIG. 6D depicts eye image 640.

FIG. 6A includes an image 610 of an iris 210 having sufficient intensity (brightness) and contrast from which a biometric measurement of the iris 210 can be performed. For the purposes of illustrating the grayscale intensity and contrast of the iris 612 contained within image 610 an elliptical annulus 614 has been drawn and the grayscale of this annulus depicted by the histogram chart 616. Note that the elliptical boundaries, including elliptical annulus 614, drawn in FIG. 6A (and similarly for FIGS. 6B through 6D) differ from the boundaries the automated software would draw for the iris, as the automatically detected boundaries would follow the iris-sclera boundary more faithfully and would follow the occlusion boundary of the eyelids which the simple hand-drawn elliptical boundary of FIG. 6A avoids. This image 610 was captured while flash projection (illumination) of system generated light was being directed towards the iris 210 of a particular subject.

This image 610 further includes (2) specular reflections 618a-618b that are each caused by system generated light being transmitted from a single cluster of (3) LEDs within an LED group (bank) of the system 400, which functions as a projection component of system generated light. Specular reflection 618a is a cluster of (3) reflections caused by transmission of system generated light from a first group of LEDs. Specular reflection 618a appears as one reflection, however this reflection 618a is actually a cluster of (3) reflections caused by transmission of system generated light from a first group of LEDs of the system 400. Likewise, reflection 618b appears as one reflection, however this reflection 618b is actually a cluster of (3) reflections caused by transmission of system generated light from another second group of LEDs.

This image 610 is characterized as having a distribution of pixel grayscale values that are located within the annular iris portion 612 of the image 610 that average to a grayscale value of about 81 with a range of 55 to 135 within a range of grayscale values from 0 through 255. Given the gray level of the ambient light only illuminated iris that will be discussed when analyzing image 620, this average of 81 is considered sufficiently bright and the grayscale range of 81 which equals the difference in extreme gray scale values (136-55) is considered a sufficiently large contrast to perform an accurate and reliable biometric measurement of the iris portion 612 of the image 610.

Each grayscale pixel value is a representation of pixel intensity and of pixel brightness. The distribution of grayscale values of the iris portion 612 of this image 610 range from 55 to 136. The mean of this distribution is a pixel value of about 81.1. The algorithms which search for and identify texture features within the iris portion 612 of this image 610, characterize this image as having sufficient intensity (brightness) and contrast from which a biometric measurement of the iris 210 can be performed. Typically, 8-bit grayscale images with a distribution of grayscale iris pixel values having a weighted average of about 70 grayscales and an iris pixel grayscale range (contrast) of greater than 40 grayscales, the iris image is considered to be sufficiently bright and have sufficient contrast to allow high-quality iris identifications to be achieved.

In FIG. 6B a second image 620 of the iris 210 of image 610 is depicted. Image 620 was the result of a shutter exposure of about 2 milliseconds without projection of any system generated light in an environment having ambient light flux of about 10,000 lux (outdoor ambient light). By having the system illumination off, image 620 only records the effect of the ambient light on the iris image. The distribution of grayscale values 626 of the elliptical annular portion 624 of the iris portion 622 of this image 620 ranges from 4 to 20. The mean of this distribution is a pixel value equal to about 9.28 (significantly below the 81 average gray levels obtained with the combined system-generated illumination and the ambient illumination illustrated in FIG. 6A). Note that to enhance clarity, pixel intensities in image 620 in FIG. 6A have been made artificially brighter than the true values registered in histogram 626 for clarity.

The algorithms which search for and identify edges within the iris portion 622 of this image 620 would not likely characterize this image as having sufficient intensity (brightness) to permit a biometric measurement of the iris portion 622 to be extracted. However, the purpose of image 620 is not to process an iris image (since the apparatus' illumination is off), but rather to better illustrate the operating settings and design of the scanning apparatus 110, 310, 400 of the present invention, and to show that ambient light reflections 628 are not significantly visible in the iris portion 210 of the eye 114, as shown when the system generated light is removed.

When the system illumination is on and a picture of an iris is taken (i.e., image 610), the effects of ambient illumination are sufficiently mitigated so that a high-quality image of the iris can be captured and processed. Assuming the black level offset of sensor 316 is 0 (i.e., when no light impinges on sensor 316 that the pixels register a zero gray value), then the average gray level of the iris when no system illumination is on is 9.28 or 13.3% of the desired 70 gray level minimum for the iris. However, as shown in image 610, with the system illumination on, the average gray level of the iris portion of the image is 81.5, so the ambient illumination effect is at most 9.29/81.5=11.3% of the total gray level average for the iris image. The effect of ambient illumination is therefore minimized with the present invention.

It should be noted that the desired iris grayscale average of 70 (out of 255), which is an indicator of brightness, stated previously is not considered a hard set rule for the present invention, rather, what is critical is the exposure effect of the ambient light in relation to that of the total light, termed herein as the ambient exposure ratio. In particular, it is preferable that the ambient exposure ratio is less than 30%, while still ensuring that no or very limited portions of the iris image contain saturated pixels (e.g., gray levels of 255 out of 255). Therefore, for an iris image that has a total exposure effect of 70 gray scale levels average out of 255, the ambient average gray level should be less than 21 grayscales. Conversely, if the ambient average gray level is 40, the preferred average gray level of iris in the total exposure must be greater than 133, so that the ambient average gray scale level is equal to 30% or less than the average grayscale level of an iris image suitable for biometric information extraction.

In one embodiment of the present invention, the system measures the ambient exposure ratio. This may be accomplished by taking a series of images that alternate between having the system-generated light on and with said light being off. The iris image portion of each of these images in the series can be located, the average iris gray level determined, and the ambient exposure ratio calculated. Note that for this image series, the system-generated illumination need not alternate between being on for one image, off for the following image, and on for the next. Rather it may be determined, that it is more efficient to turn off the system-generated illumination for every $2^{nd}$, $3^{rd}$, $4^{th}$, $5^{th}$, etc. image.

Alternatively a separate sensor (not drawn) may be present in the apparatus where said separate sensor is for the purposes of measuring the ambient light levels when the system illumination is off (e.g., in between flashes). The separate sensor would preferentially have optics in front of it allowing it to see the same or at least a portion of the field of view of the main imaging system of the apparatus, where the iris is expected to be. Since this separate or secondary sensor is for purposes of measuring ambient light, it may comprise a coarser 2D detector, but it may also comprise a single PIN photodiode. In either case the optics in front of the sensor do not require the same degree of imaging quality as that of the primary sensor. Since this secondary sensor is not used to image and locate the iris, but rather to capture an average light intensity from an ambient-light illuminated only scene, a scale factor can be calculated that relates the ambient light intensity detected to the average gray level of the iris under total exposure conditions measured by the image of the primary sensor.

If the ambient exposure ratio is calculated to be less than 30%, it is preferred that the system take one or more actions. In one embodiment, the system notifies the (operator) user or subject (such as in the case of an unmanned operation) that the ambient light is too high and that an acceptable image cannot be taken without the user or subject shielding the ambient light. Such notification may be accomplished through audio beeps or words and/or through visual cues such as colors or words from indicator LEDs or LCD panels. The user/subject may be notified to take action such as shielding the ambient light with ones hands and/or rotating the subject relative to the ambient light to minimize its effect.

Alternatively, or in combination, the system may increase the amount of system-generated light to achieve the desired ambient exposure ratio. Said increase in system-generated light may be achieved by driving the system illumination harder, for example, increasing the current of the LED groups 412, 414, 422, and 424 depicted in FIG. 4A. Alternatively or in addition, additional system illumination sources may be turned on. For example, the illumination groups 412, 414, 422, and 424 depicted in FIG. 4A illustrate three LEDs each. In some embodiments, the system could be set up such that under normal operation, only two out of the three LEDs turn on with the third turned on only when the ambient light is particularly bright.

Alternatively, the groups may contain four or five LEDs (not drawn), wherein three are normally on and the additional one or two are turned on as the ambient illumination becomes progressively brighter. To maintain exposure control (i.e., to ensure the sensor pixels do not saturate), the effective exposure time of the sensor would be appropriately reduced with the increase in the system illumination. For simplicity in the rest of the teachings of the present invention, the 70 gray level average for the desired total exposure effect of the iris portion of the image will be utilized, but as discussed above, this 70 gray level is not a requirement for the present invention.

FIG. 6C includes a third dark (an insufficiently bright) image 630 of the iris 210 of FIG. 2. This image was exposed for 4 milliseconds without projection of any system generated light, in an environment having ambient light flux of about 10,000 lux. The distribution of grayscale values 636 of the elliptical annular portion 634 of the iris portion 632 of this image 630 range from 13 to 45. The mean of this distribution is a pixel value equal to about 21.9. To better illustrate the appearance of the eye in image 630 and to show the visible ambient reflections 638 within the iris 632, the brightness of image 630 was enhanced as shown here.

The algorithms which search for and identify texture features within the iris portion 632 of this image 630 would not characterize this image as having sufficient intensity (brightness) to allow a biometric measurement of the iris portion 632 to be performed. Also notice that there are faint visible ambient reflections 638 within this image 630. By one measure, the mean brightness (intensity) of this image 630 is about (21.9/70-31.3) percent of a mean grayscale brightness that is typically sufficient for a biometric measurement of the iris portion 632 of the image 630 to be performed.

Alternatively, simultaneous projection of system light during the exposure of this image would increase the mean brightness (intensity) of this image 630. Hypothetically, if such projection of system light raised the mean brightness (intensity) of this image 630 to a pixel grayscale value equal to 70, then the exposure effect contribution of the ambient light would be equal to about 31.1 percent and the exposure effect contribution of the system generated light would be equal to about 68.9 percent, of an image having sufficient brightness from which a biometric measurement of the iris portion 632 if the image 630 could be performed.

FIG. 6D includes a fourth slightly dark (slightly underexposed) image 640. This image was exposed for 11 milliseconds without projection of any system generated light, in an environment having ambient light flux of about 10,000 lux. The distribution of grayscale values 646 of the elliptical annular portion 644 of the iris portion 642 of this image 640 range from 39 to 134. The mean of this distribution is a pixel value equal to about 61. Also notice that visible ambient reflections 648 are present within this image 640 and constitute noise.

The algorithms which search for and identify edges within the iris portion 642 of this image 640 would generally not characterize this image as having sufficient intensity (brightness) for a biometric measurement of the iris portion 642 to be performed due to the amount of ambient reflections 648 present in this image 640. By one measure, the mean brightness (intensity) of this image 620 is about 61.9/70=88.4 percent of typical mean grayscale brightness that would typically be sufficient such that a reliable biometric measurement of the iris portion 642 if the image 640 could be performed. However, in this circumstance, because the amount of ambient light in relation to system-generated ER is sufficiently high, this amount of ambient light can interfere with performance of an accurate and reliable biometric measurement of the iris portion 642 of the image 640.

Alternatively, simultaneous projection of system light during the exposure of this image would increase the mean brightness (intensity) of this image 640. Hypothetically, if such projection of system light raised the mean brightness (intensity) of this image 640 to a pixel grayscale value of about 70, then the exposure effect contribution of the ambient light would be equal to about 88.4 percent and the exposure effect contribution of the system generated light would be equal to about 11.6 percent, of an image typically having sufficient brightness from which an accurate and reliable biometric measurement of the iris portion 642 if the image 640 could be performed.

Figure 7:
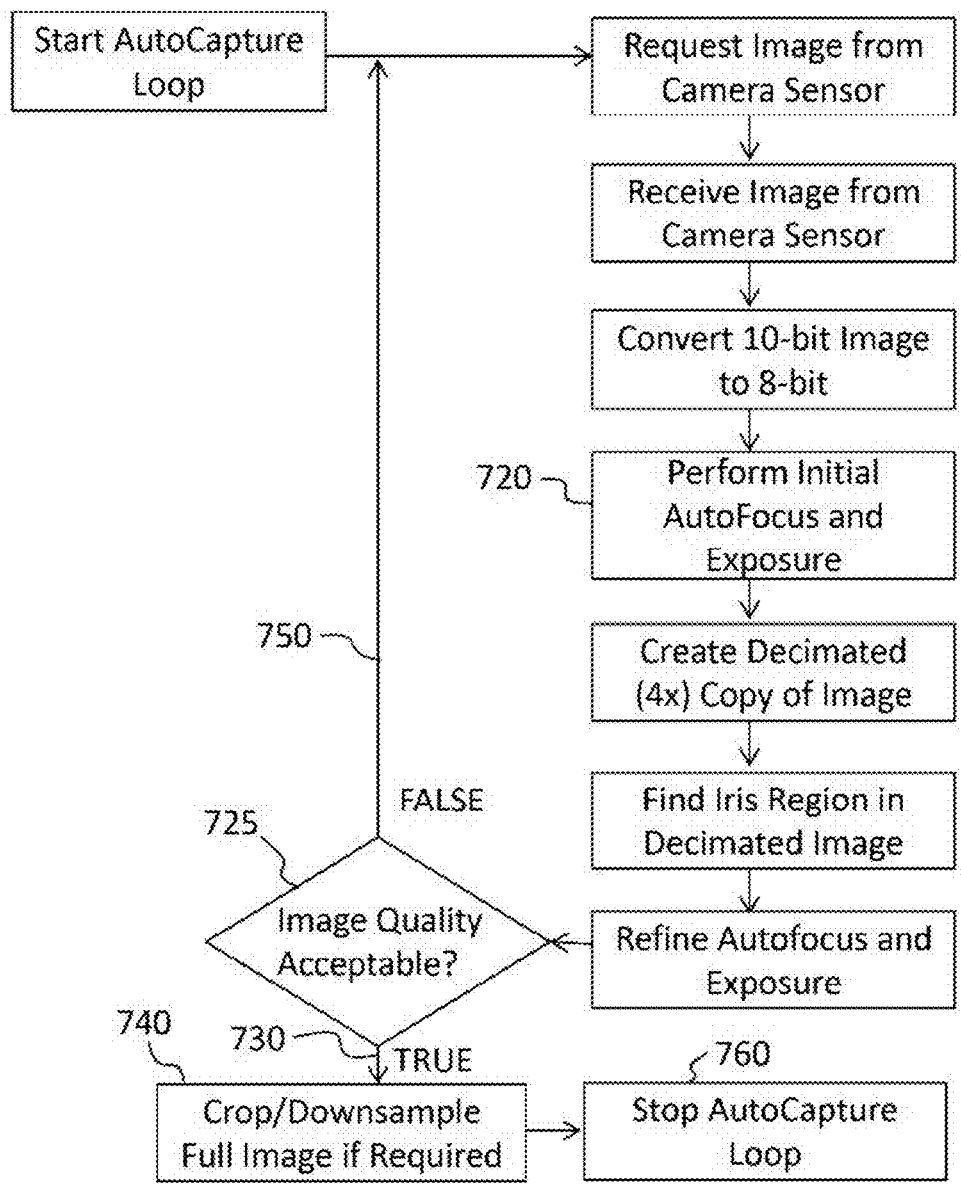
FIG. 7 illustrates a flow chart for capturing and processing a series of one or more iris images.

FIG. 7 illustrates a flow chart for capturing and processing a series of one or more iris images. As described in association with FIG. 4C, the system 430 captures a series of one or more images of the iris over time. Each image in the series is captured and processed to determine if the image satisfies image quality requirements, which include sufficient exposure (brightness), contrast (grayscale) and focus.

In some embodiments, a control loop defined by control logic that directs operation of the system 110, 310, 400 by interfacing with a processor, is also referred to herein as an automatic image capture control loop, and also referred to herein as an AutoCapture Loop, which directs capture and processing of each image in the series. For example, within the dual iris image capture embodiment 400, the control logic would interface with the processor 432a-432b. The control logic is encoded as software, firmware, and/or hardware. Control logic can also be encoded and reside within other components, such as for example, within a field programmable gate array (FPGA). In one embodiment, this control loop is implemented in software and begins with an image request to the Camera Sensor. For each image captured, an automatic focus and exposure action 720 is completed. In step 720, the system determines a focus metric and an exposure metric of the image in order to determine how well in focus and how well balanced the exposure settings are, respectively.

By way of example, the focus metric can be set to a Sobel method where the magnitudes of the gradients are measured. Alternative focus measurement methods include relative magnitude of high spatial frequency components as discussed by Daugman, U.S. Pat. No. 6,753,919. For the exposure metric, the system may have a set average gray level that the image or the portion of the image centered about the iris needs to meet. Adjustment of the image exposure may be accomplished through the use of one of or a combination of adjustment of the system-generated ER intensity, the sensor pixel exposure time, and the electronic gain of the image sensor.

An automatic focus and exposure action is refined (adjusted) and tested for image quality 730. This action iteratively measures and adjusts focus, and iteratively measures and adjusts exposure in pursuit of an image having sufficient quality with respect to focus and exposure. In some embodiments, adjusting exposure can include adjusting the projection and intensity of system generated electromagnetic radiation (ER). Also, adjusting exposure may involve adjusting an exposure aperture (e.g., aperture stop of imaging system 312) and/or an exposure period of time.

In one step 725 of the Autocapture Loop Sequence, the quality of the image is tested and queried. If image quality is sufficient (acceptable) 730, then further processing of the captured image is performed (block 740) and the automatic image capture control loop is terminated 760. This further processing in process block 740 includes cropping and down sampling. If image quality is not acceptable 750 with respect to the results of this further processing, another iteration of the automatic image capture control loop is performed.

In some embodiments, the system provides automatic focus functionality and commences exposure action/commences upon establishing focus in an automatic manner. In other embodiments, the system provides non-automatic focus functionality in the form of manual focus and/or or fixed focus functionality. Exposure action, being an iterative measurement and adjustment of exposure, commences upon establishing focus in an automatic or a non-automatic, manual or fixed manner. In this the embodiment of non-automatic focus functionality, the lens assembly has a non-automatic focus function and other control logic for obtaining a series of one or more captured biometric images, at least one of which is of sufficient quality of a subject.

In some embodiments, the system 110, 310, 400 includes an ambient light level sensor, which provides a measure of an amount of ambient light surrounding the system 110, 310, 410. For photopic imaging applications, Preferably, the ambient light level sensor preferably outputs a measure of ambient light in units of Lux. In non-photopic imaging applications, such as iris imaging which typically utilizes near infrared electromagnetic radiation, the ambient light level sensor preferably measures ambient light in other units such as mW/cm2. For all embodiments, it is preferable that the ambient light sensors has a spectral filter or other means such that only light that would affect the image capture system of the main system is measured.

In some embodiments, during the AutoCapture Loop Sequence, an amount of ambient light and an amount of system generated light, if any, in combination with other operational settings, collectively referred to herein as a set of image capture parameters, is recorded in association with each captured image and in association with a measure of quality for that image. The measure of image quality for that image is collectively referred to as a set of image quality parameters. The set of image quality parameters includes a measure of brightness of the image. In some photopic imaging embodiments, an Intersil (Model ISL29033) is employed to measure ambient light levels. For embodiments capturing light in the near infrared, such as iris capture systems, then a silicon photodiode, such as a FSD100 from Thorlabs (Newton, N.J.), may be utilized.

By storing a set of image capture parameters and image quality parameters in association with each captured image, an amount of system generated light required to capture an image of sufficient quality, based upon the amount of ambient light present at the time of image capture, can be estimated. Also, a contribution of exposure effect associated with a measured amount of ambient ER relative to a total exposure effect of a combination of system generated and the ambient ER, can be estimated. This ambient ER contribution is expressed as a percentage of the total exposure effect of the combination of ambient ER and system generated ER.

In some embodiments, if the amount of ambient light is determined (during the AutoCapture Loop Sequence or outside of it) to be above a first threshold value, then the system is configured to automatically adjust an amount of system generated electromagnetic radiation and an amount of exposure to reduce a contribution of exposure effect from the ambient electromagnetic radiation to below a second threshold.

In some embodiments, if the amount of ambient light is determined to be above a limit value, the system then alerts the operator to perform actions to lower effect of ambient light. These actions can include requesting the subject to move to a different position or to shield their eyes from ambient light in order for a suitable image to be captured by the system 110, 310, 400

In some embodiments, the first threshold value and the second threshold values, and the limit value are each expressed as an estimated contribution of ambient light exposure effect, based upon a measure of ambient light (ER) and other image capture parameters. In other embodiments, the first threshold value is directly expressed as an ambient light (ER) lux or mW/cm$^2$ value, while the second threshold remains expressed as an estimated contribution of ambient light exposure effect.

Figure 8:
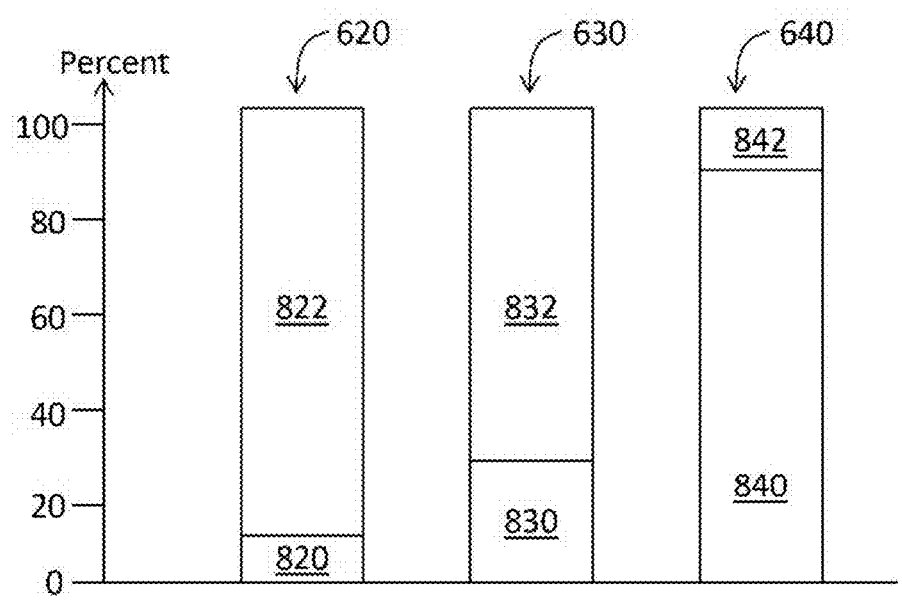
FIG. 8 illustrates a representation of a contribution of exposure effect upon digital pixels of the image sensor by ambient and system generated electromagnetic radiation.

FIG. 8 illustrates a bar chart mapping the exposure effect for the three different images 620, 630, and 640. For each image the total exposure effect upon pixels of the image sensor caused by ambient and system generated electromagnetic radiation is scaled to 100%. The total exposure effect is divided between ambient electromagnetic radiation 820, 830, 840 respectively, and system generated electromagnetic radiation 822, 832, 842 respectively with the assumption that the total exposure effect at the iris should represent a gray scale average of 70 gray levels.

As discussed in connection with image 620 of FIG. 6B, if the system generated illumination is turned on and increased until the average gray level of the iris image pixels reaches a gray value of 70, then the contribution of exposure effect of ambient light 820 equal to about 13.3 percent. Similarly if the system-generated illumination is turned on an for image 630 of FIG. 6C, and increased until the average gray level of the iris image pixels reaches a gray value of 70, then the contribution of exposure effect of ambient light 830 equal to about 31.3 percent. If the system-generated illumination is turned on for the ambient light conditions of image 640 of FIG. 6B, and said system illumination increased until the average gray level of the iris image pixels reaches a gray value of 70, then the contribution of exposure effect of ambient light 840 equal to about 88.4 percent. The contribution of exposure effect 822, 832, 842 indicates what amount of system generated light would be necessary to further expose each image 620, 630, 640 to an acceptable level of brightness for further biometric image processing.

Referring back to FIGS. 4A-4C, in this embodiment, each iris 210 of a subject 112 is imaged while located approximately 6-10 inches from each respective lens assembly 410, 420 of the image capture system 400. Each iris 210 of the subject 112 is illuminated by the system via flash projection of system generated electromagnetic radiation that substantially falls within a wavelength range between 715 and 900 nanometers.

In this embodiment, this system generated projection of electromagnetic radiation is performed via employment of high-power light emitting diodes (LEDs) including a group of (3) 850 nanometer lensed light emitting diodes (LEDs) and including a group of (3) 750 nanometer lensed LEDs, which are models SMB850D-1100-01 and SMB750-1100-01, respectively as supplied from Epitex (Kyoto, Japan).

The SMB850D-1100-01 and the SMB750-1100-01 are each rated for a maximum power dissipation of 2500 milliwatts (mW). The SMB850D-1100-01 is rated for a minimum radiated power of 560 mW at with current at 1000 milliamperes (mA) and a maximum radiated power of 1700 mW with current at 3000 mA. The SMB750-1100-01 is rated for a minimum radiated power of 330 mW at 800 mA and a maximum radiated power of 1250 mW at 3000 mA.

Referring back to FIGS. 4A-4B, the SMB750-1100-01 LED is located as the topmost and bottom most LED, and the SMB850D-1100-01 is located as the middle LED, of the leftmost group of LEDs 412 and the right most group of LEDs 424. The SMB850D-1100-01 is located as the topmost and bottom most LED, and the SMB750-1100-01 is located as the middle LED, of the left center group of LEDs 414 and the right center group of LEDs 422.

In this embodiment, to substantially reduce an effect of ambient light on captured iris images, the LEDs are each ideally pulsed (flashed) while supplying power at about 2 amperes for a period of flash projection time equal to about 4.0 milliseconds (ms). The image capture is synchronized to occur during a limited period of exposure time equal to about 4.0 ms. In this scenario, an image sensor gain value is minimized to a value of about 1.0. In this embodiment, the flash projection time and the exposure time almost entirely overlap each other, and are nearly equal in time. However, in other embodiments, the flash projection time can lag the exposure time by some amount of time or the exposure time could lag the flash time by some amount. Other embodiments could overlap each other by an equal or lesser amount.

In some embodiments, control logic further adjusts the exposure effect by adjusting at least one of a length of the first projection time and a projection intensity of the system generated ER during the first projection period of time to provide a captured image of quality that satisfies predetermined system requirements. Enlarging the projection time and/or intensity reduces the contribution of ambient light of the exposure effect, which is desirable, especially in circumstances where the ambient light contribution to the exposure effect is too high and is causing undesirable ambient light reflections.

In combination, the control logic can further adjust the exposure effect by adjusting the second limited exposure period of time to provide an image quality that satisfies the predetermined system requirements. Generally, exposing an image for a period of time beyond a period of time that the system is receiving system generated ER raises the contribution of ambient light of the exposure effect, which is undesirable.

For an image to have sufficient quality to meet predetermined system requirements, the image should include an identified (verified) biometric pattern, and should be of sufficient brightness and contrast, and of sufficient focus to further process the biometric pattern. In some embodiments, an algorithm is employed to identify (verify) a presence of a biometric pattern within a capture image.

Also in this embodiment, the image sensor 316 preferably has an electronic shutter integrated into the sensor electronic design and specifically a global electronic shutter. The global electronic shutter allows the image sensor 316 to begin and end the integration time of all pixels simultaneously or nearly. In this embodiment, the image sensor 316 is a model EV76C560 sensor that is supplied from e2v Semiconductors Plc (Chelmsford, England). This sensor includes a 1280×1024 array of 5.3 um pixels and provides global electronic shutter exposure times in a 0.1 to 5 ms time range.

Other embodiments of electronic shutters integrated into an image sensor that may be used in the present invention include global reset and rolling shutters. Alternatively, the shutter mechanism is not integrated into the electronics of the sensor and is mechanical or electro-optical in nature. By way of example, a mechanical shutter may be an electrically triggered physical shutter that opens and closes in order to control the exposure time of the sensor pixels. Such a physical shutter may be similar to that which is incorporated into consumer DSLR cameras.

Alternatively said mechanical shutter may be achieved by flipping a mirror into and out of the optical path of the imaging system. An electro-optical shutter is one wherein an electrical signal produces an optical effect in a material or materials for the purpose of alternating between substantially blocking and passing the ER of the scene the image capture system is pointed at in order to control the exposure time of the sensor pixels. By way of example, an electro-optical shutter may comprise of liquid crystals or electro-optic materials (e.g., KDP, BBO, or $LiNbO_3$), combined with one or more polarizers. One such electro-optical shutter is termed a Pockels cell.

Also in this embodiment, an objective lens 410, 420 is designed for a 5.3 um sensor pixel size, and an electronic resolution of 21 pixels/mm at an object distance of 10" (254 mm), resulting in a focal length of approximately 26.2 mm. Although a fixed focus system may be incorporated into the image capture system 110, 310, 400, this requires that for optimal image focus either the operator must move the system towards the subject, the subject must move towards the operator, or a combination thereof. Therefore, in the preferred embodiment, an autofocus mechanism is used in order to ensure the images of biometric features are in focus. The autofocus mechanism may be derived through a combination of mechanical and electronic focusing.

By way of example, a mechanical focus mechanism includes the moving of the image sensor 316 along the optical axis relative to the object lens 312 (longitudinal movement). Alternatively the objective lens 312 may be moved along the optical axis relative to the image sensor 316. Still, another mechanical autofocus mechanism is the longitudinal movement of one or more lenses within the objective lens 312 while the image sensor 316 is either stationary or in motion coordinated with the aforementioned longitudinal lens movement.

An example of an electronic autofocus mechanism includes the use of an optical element such as a lens whose optical power changes as a function of an applied voltage or current. Therefore, in some embodiments of the present invention, an objective liquid lens (Model Artic 316 with clear aperture of 2.5 mm) from Varioptic a division of Parrot SA (Lyon, France) is employed. This type of liquid lens may be designed as the aperture stop of a multi-element objective lens and provides for a variable 26.2 to 24.8 mm focal length required to focus objects at a distance of 6" to 10". Such an objective lens is capable of achieving >60% contrast transfer function (CTF) at (4) line pairs per millimeter across the 6" to 10" range of the iris object distance.

Also in this embodiment, the system incorporates into the objective lens a band pass spectral filter that achieves high transmission (>60%) within the spectral range of 715 to 900 nm, and ideally little light is transmitted outside of this range, which includes electromagnetic radiation that is mostly outside of a range that is visible to the human eye.

Such a filter may be constructed using purely dielectric stack of coatings on a BK7 substrate or the combination of a dielectric stack on top of a substrate that already blocks out the shorter wavelength light, such as a RG715 filter glass from Schott North America, Inc. (Elmsford, N.Y.) or R-72 filter glass from Hoya Corporation USA (Santa Clara, Calif.).

In some embodiments, using the above described system parameters in an environment where the ambient light is of a distribution typical to that of sunlight and with an intensity that generates 10,000 lux of reflected light off the eye and the skin surrounding the eye of the subject 112, the flash projected electromagnetic radiation is combined with the ambient electromagnetic radiation to expose a captured image. Within the combined electromagnetic radiation, a majority of the exposure effect is caused by the system generated electromagnetic radiation, and a minority of the exposure effect is caused by the ambient electromagnetic radiation.

In the preferred embodiment, the system is capable of reducing contribution of exposure effect of ambient ER to less than 20% of the combined exposure effect of system generated ER and ambient ER.

As shown, in this embodiment and environment, a minimum of approximately 70 percent of the exposure effect is caused by the flash projected system generated electromagnetic radiation, which lacks undesired ambient reflections. A maximum of approximately 30 percent of the exposure effect is caused by the ambient electromagnetic radiation. As a result, an exposure effect caused by undesired reflections within the ambient electromagnetic radiation is substantially reduced (diluted) and the resulting captured image is less affected by the undesired ambient reflections. Said another way, the ambient reflections are attenuated (diminished) via combination and dilution with the system generated electromagnetic radiation, and as a result, are less visible, if visible at all from the human eye, within the captured image.

The exposure effect percentage is determined by creating a first image by exposing the first image with the combined ER and a second image of approximate equal exposure and grayscale brightness by exposing the second image with ambient light alone. A ratio of exposure time between that of the first image and second image indicates the relative exposure effect.

For example, if the second image requires twice the exposure time of the first image, then the ambient ER has approximately half of the exposure effect per unit exposure time as the combined ER. The contribution of the ambient ER would be approximately half of the combined ER. However, for a product version of the present invention, the image capture system does not require creating the first and second image described earlier, but rather has been designed such that for most, if not all, ambient light use-cases the system illumination is sufficiently bright (while remaining eye-safe) and the pixel exposure times sufficiently short that the effects of ambient light reflecting off of the biometric feature of interest, for example a human eye, are negligible.

As a result of dilution of the ambient exposure effect, image processing software can more accurately identify and process patterns within each or both irises 210 of the captured image, even when the image is captured outdoors and/or captured in an environment having a substantial amount of non-obstructed sunlight. Such a benefit can be realized when there is as little as a 1 to 1 ratio of system generated light to ambient light, which reduces the exposure effect of the ambient light from 100 percent to 50 percent of the (combined) overall exposure effect, which is a reduction by a factor of two. In other words, in this scenario, the exposure effect of the ambient light is reduced (diluted) to approximately ½ (one half) of the overall exposure effect of the combination of electromagnetic radiation upon the captured image.

However, improved benefits are realized when there is as little as a 2 to 1 ratio of system generated light to ambient light, which reduces the exposure effect of the ambient light from 100 percent to 33 percent of the (combined) overall exposure effect, which is a reduction by a factor of three. In other words, in this scenario, the exposure effect of the ambient light is reduced (diluted) to approximately ⅓ (one third) of the overall exposure effect of the combination of electromagnetic radiation upon the captured image. More benefits are realized from even further dilution of the ambient light.

Simply using the system in a reduced intensity ambient environment, can yield a higher system generated to ambient ER ratio. For example, using the system in a 5000 Lux environment, as opposed to a 10000 Lux environment, will improve the effectiveness of this ratio.

For example, if ⅔ of the combined overall exposure effect is caused by system generated electromagnetic radiation, and ⅓ of the combined overall exposure effect is caused by ambient light, then there is exactly a 2 to 1 ratio of system generated ER to ambient ER. The 70 percent to 30 percent ratio described above, approximates to a 2 to 1 ratio system generated ER to ambient ER. Likewise, a 63 percent of system generated ER to 37 percent ambient ER would also approximate to a 2 to 1 ratio.

In other embodiments, this ratio can be substantially increased via a more intense flash, for example, to a 2.5, 3, 4 or 5 to 1 value, to more effectively protect against harsh ambient lighting environments. However, the design of the ER flash projection should satisfy eye safety standards. A flash that is too powerful and/or too long in time duration can cause total ER exposure to the eye 114 of the subject 112 to exceed eye safety standards.

Furthermore, the flash projection ER should not startle or cause the subject 112 to squint or flinch. Most of the flash projection ER is outside of the human visible range and is less visible than a same intensity of ER within a human visible range of wavelengths.

On one aspect, the invention provides for a system for capturing a biometric image of a surface of a subject without requiring shielding of ambient light away from the surface. In some embodiments, the system including a projection component configured for projecting system-generated electromagnetic radiation for a first limited period of projection time onto a biometric surface of a subject, reflection of the system-generated electromagnetic radiation from the biometric surface of the subject combines with ambient electromagnetic radiation to create a combination of electromagnetic radiation entering a lens assembly.

In this embodiment, the system further including an image sensor configured to receive the combination of electromagnetic radiation from the lens assembly; and a shutter configured to expose each of a plurality of pixels of the image sensor to the electromagnetic radiation for a second limited exposure period of time, and including control logic for receiving a series of one or more images, the series of images terminating upon capturing an image having a sufficient quality; and where a contribution of an exposure effect upon the plurality of pixels of the image sensor from the system-generated electromagnetic radiation is greater than a contribution of an exposure effect of said ambient electromagnetic radiation.

The some embodiments, an image is classified as having sufficient quality by having at least one of an identifiable biometric surface, a sufficient brightness and contrast, and a sufficient focus. In some embodiments, the biometric surface is automatically verified as being a biometric surface via an image capture algorithm that processes an image of said biometric surface and that searches for surface patterns that satisfy biometric image feature criteria associated with said biometric surface.

In some embodiments, the system can be implemented as a portable product that is designed to be hand carried and to weigh, by itself, less than 5 pounds. This system is typically further incorporated into other products that are designed to be portable and that typically weighing 10 pounds or less.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for capturing a biometric image of a surface of a subject without requiring shielding of ambient electromagnetic radiation away from the surface, the system designed for operation within environments having ambient electromagnetic radiation ranging from a low to a high intensity, comprising:
   a system including
   a projection component configured for projecting system-generated electromagnetic radiation for a first limited period of projection time onto a biometric surface of a subject, reflection of said system-generated electromagnetic radiation from said biometric surface of said subject combines with ambient electromagnetic radiation to create a combination of electromagnetic radiation entering a lens assembly,
   an image sensor configured to receive said combination of electromagnetic radiation from said lens assembly; and
   a shutter configured to expose each of a plurality of pixels of said image sensor to said electromagnetic radiation for a second limited exposure period of time, and
   control logic for receiving a series of one or more images, said series of images terminating upon capturing an image satisfying image quality criteria with respect to at least one of brightness, contrast and focus; and
   wherein a contribution of an exposure effect upon the plurality of pixels of said image sensor from said system-generated electromagnetic radiation is greater than a contribution of an exposure effect of said ambient electromagnetic radiation, while said system is operating in an environment of ambient electromagnetic radiation of a high intensity and of at least 10,000 lux.

2. The system of claim 1 wherein said image satisfying image quality criteria is an image having an identifiable biometric surface with respect to image brightness and contrast, and a measurable focus.

3. The system of claim 1 wherein said biometric surface includes at least one iris portion of an eye surface.

4. The system of claim 1 where said biometric surface is automatically verified as being a biometric surface via an image capture algorithm that processes an image of said biometric surface and that searches for surface patterns that satisfy biometric image feature criteria associated with said biometric surface, and wherein said biometric surface is an iris.

5. The system of claim 1 wherein said system-generated electromagnetic radiation is projected within a range of wavelengths that at least mostly reside outside a range visible to the human eye.

6. The system of claim 1 including a filter that is configured to filter and pass said combination electromagnetic radiation to the image sensor that resides mostly outside a range visible to the human eye.

7. The system of claim 6 wherein said filter performs filtering by employing at least one of a band pass filter and a high pass spectral filter.

8. The system of claim 1 wherein said shutter is characterized as being at least one of a mechanical shutter, an electro-optical shutter, an electronic shutter and a global electronic shutter.

9. The system of claim 1 wherein at least one of said first limited period of projection time and said second limited exposure time ranges from 0.01 to 5.0 milliseconds.

10. The system of claim 1 wherein a contribution of exposure effect from said ambient electromagnetic radiation is no more than one third of a total exposure effect of said combination of electromagnetic radiation, and wherein said ambient electromagnetic radiation is 10,000 lux or higher.

11. The system of claim 1 wherein a contribution of exposure effect from said ambient electromagnetic radiation is no more than one fifth of a total exposure effect of said combination of electromagnetic radiation, and wherein said ambient electromagnetic radiation is 10,000 lux or higher.

12. The system of claim 1 wherein said lens assembly has a focus function and a control logic for obtaining a captured biometric image of a subject who is located at a non-fixed distance from the lens assembly of the system.

13. The system of claim 1 wherein said control logic further adjusts said exposure effect by adjusting at least one of a length of said first projection time and intensity of said projection.

14. The system of claim 1 wherein said control logic further adjusts said exposure effect by adjusting said second limited exposure period of time.

15. The system of claim 1 wherein said lens assembly has a non-automatic focus function and a control logic for obtaining a captured biometric image.

16. The system of claim 1 including an ambient light level sensor.

17. The system of claim 16 wherein if an amount of ambient light is determined to be above a first threshold, then the system adjusts an amount of system generated electromagnetic radiation and an amount of exposure to reduce a contribution of exposure effect from said ambient electromagnetic radiation to below a second threshold.

18. The system of claim 16 wherein if an amount of ambient light is determined to be above a limit value the system then alerts the operator to perform actions to lower effect of ambient light.

19. The system of claim 1 designed to be hand carried and weighing less than 5 pounds.

20. An apparatus for capturing a biometric image of a surface of a subject without requiring shielding of ambient light away from the surface, comprising:
- a projection component configured for projecting system-generated electromagnetic radiation for a first limited period of projection time onto a biometric surface of a subject, reflection of said system-generated electromagnetic radiation from said biometric surface of said subject combines with ambient electromagnetic radiation to create a combination of electromagnetic radiation entering a lens assembly,
- an image sensor configured to receive said combination of electromagnetic radiation from said lens assembly; and a shutter configured to expose each of a plurality of pixels of said image sensor to said electromagnetic radiation for a second limited exposure period of time, and
- control logic for receiving a series of one or more images, said series of images terminating upon capturing an image satisfying image quality criteria with respect to at least one of brightness, contrast and focus; and
- wherein a contribution of an exposure effect upon the plurality of pixels of said image sensor from said system-generated electromagnetic radiation is greater than a contribution of an exposure effect of said ambient electromagnetic radiation.

21. A method for capturing a biometric image of a surface of a subject without requiring shielding of ambient light away from the surface, comprising the steps of:
- providing a projection component configured for projecting system-generated electromagnetic radiation for a first limited period of projection time onto a biometric surface of a subject, reflection of said system-generated electromagnetic radiation from said biometric surface of said subject combines with ambient electromagnetic radiation to create a combination of electromagnetic radiation entering a lens assembly,
- providing an image sensor configured to receive said combination of electromagnetic radiation from said lens assembly; and a shutter configured to expose each of a plurality of pixels of said image sensor to said electromagnetic radiation for a second limited exposure period of time, and
- providing control logic for receiving a series of one or more images, said series of images terminating upon capturing an image satisfying image quality criteria with resect to at least one of brightness, contrast and focus; and
- wherein a contribution of an exposure effect upon the plurality of pixels of said image sensor from said system-generated electromagnetic radiation is greater than a contribution of an exposure effect of said ambient electromagnetic radiation, and
- exercising said projection component, image sensor and control logic to capture an image.

* * * * *